(12) United States Patent
Agrawal

(10) Patent No.: US 8,959,035 B2
(45) Date of Patent: Feb. 17, 2015

(54) SYSTEM AND METHOD FOR SCREENING AND PROCESSING APPLICANTS

(71) Applicant: Bal Agrawal, Chappaqua, NY (US)

(72) Inventor: Bal Agrawal, Chappaqua, NY (US)

(73) Assignee: LifeWorx, Inc., New York, NY (US)

( * ) Notice: Subject to any disclaimer, the term of this patent is extended or adjusted under 35 U.S.C. 154(b) by 236 days.

(21) Appl. No.: 13/708,624

(22) Filed: Dec. 7, 2012

(65) Prior Publication Data

US 2014/0160222 A1    Jun. 12, 2014

(51) Int. Cl.
*G06Q 99/00*    (2006.01)
*G06Q 10/10*    (2012.01)

(52) U.S. Cl.
CPC .................................. *G06Q 10/1053* (2013.01)
USPC ........................................................ 705/321

(58) Field of Classification Search
USPC ............ 705/7.14, 7.42, 319, 321; 726/26–28
See application file for complete search history.

*Primary Examiner* — Mohammad Islam
(74) *Attorney, Agent, or Firm* — Orrick Herrington & Sutcliffe, LLP

(57) ABSTRACT

Disclosed are systems and methods for performing efficient job applicant screening. In particular, a network-based system is established for gathering applicant information from an applicant remotely. Analysis of the received information is performed and evaluated pursuant to a first level of screening that can be done without excessive use of resources. Upon passing the first level screening, background checks and/or interviews, which require substantial resources, are further conducted. Applicants who pass the first level of screening are scheduled for interviews, including the optional initiation of personal interviews via video chat.

22 Claims, 5 Drawing Sheets

SYSTEM AND METHOD FOR SCREENING AND PROCESSING APPLICANTS

FIELD

The present application generally relates to rapidly and efficiently checking job applicant qualifications. More specifically, the present disclosure describes computerized systems, methods and apparatuses for automatically determining the suitability of an applicant for a particular position, which can then be used to decide whether and/or what additional resources should be devoted to assessing the applicant at a next level.

BACKGROUND

Checking a job or contractor applicant background is a common screening process. For many fields the type of information required to evaluate a candidate is well known and easy to establish. For example, qualifications for professional jobs are typically determined based on the candidate's education, previous employers, and areas of expertise. These qualifications are generally presented in a resume format. For accountants, attorneys, finance, marketing and other management professionals, this information has proven adequate to provide a fair indication of a professional's qualifications and possession of the required skills.

In many other industries, such as service based jobs, identifying and gathering relevant and credible information to establish an applicant's qualifications is difficult. This is particularly true where individuals work in small businesses, remote locations or in private homes. These work environments limit the available information about potential applicants. The ability to get reliable information about a candidate is especially problematic where a job does not have established educational programs, training or accreditation that can be used to demonstrate an applicant's job proficiency. This is typically true for many in-home service jobs, such as housekeepers and nannies, or other service industry workers, such as waiters and servers.

Moreover, the transition time from one job to the next tends to be fairly quick for service types jobs. When management professionals change jobs the process of job searching and interviewing often spans a number of weeks or months. This typically provides ample time to confirm the applicant's credentials and check the applicant's references. Basic service jobs, however, may have transitions where applicants change positions in a matter of few days. This presents a challenge to try and identify qualified applicants quickly because the best applicants may find a new assignment in a matter of days.

SUMMARY OF INVENTION

An innovative method of screening and processing an applicant's information is presented to solve the issue of the need for speed and a lack of standardized information sources. The disclosed system and methods are applicable to most service industries, such as, for example, hospitality, food and beverage service, personal care, housekeeping, childcare, eldercare, lawn and home maintenance and construction.

The disclosed systems and methods rely on criteria for which accurate information is readily available and creates fairly good initial insight without delaying the whole process. The information used for an initial rapid analysis is not seeking to determine the ultimate fit such that it completely excludes false positives and false negatives. Rather limiting the number false positives and false negatives provides efficiency by limiting the broader group of applicants considered by the system.

A computer system and method for efficiently gathering and reviewing applicant information for making employment decisions is provided to solve the many challenges of vetting service job employment applicants. A user interface is provided for collecting applicant background information from an applicant. In two particularly advantageous embodiments the user interface is provided via a Web server or a mobile app. A processing system receives the applicant background information (such as, skills, identification information, availability, references and experience). The processing system analyzes the received skills and experience information to perform a first test of suitability for the applicant. If the applicant receives a passing score on the first test of suitability, the processing system transmitting background check requests, via a network interface, based on the identification information. In a further embodiment, the applicant can be asked to pay for the cost of background checks if he or she receives an intermediate score on the first suitability test. The background check requests could include one or more of the following: Social Security validity check; credit report; drivers license check; driving record check; or criminal background check. The processing system receives the background check results for the applicant and analyzes the results to perform a second test of suitability for the applicant. If the applicant receives a passing score on the second test or a combined first and second test, suitability the applicant is presented an interview scheduling screen via the user interface. The applicant can use the user interface to transmit a requested interview time, which is received and a confirmation is provided. In a particularly advantageous embodiment, a video chat can be initiated to conduct the applicant interview or reference interviews. In a further embodiment the interview with the applicant is rescheduled if a reference check is not conducted prior to the scheduled time of the applicant interview.

DETAILED DESCRIPTION

Figure 1:
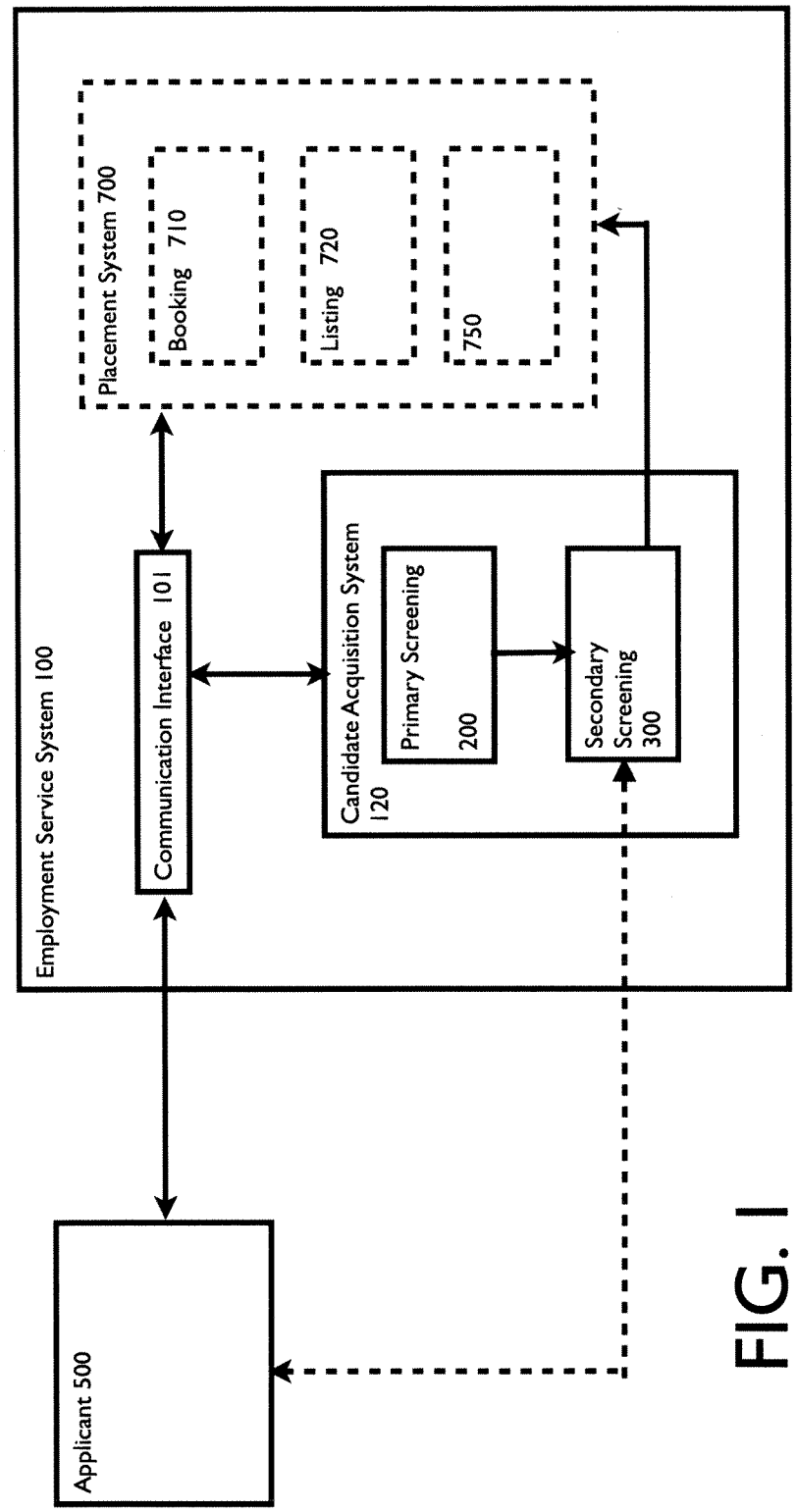
FIG. 1 shows an exemplary overview of employment service system.

The present disclosure describes a number of techniques and systems that develop information sufficient to rapidly evaluate the prospects for a job applicant. The present disclosure further describes computerized systems and methods for automatically evaluating the information developed about the applicant to decide whether and/or what resources to devote to pursuing a given applicant. These systems can be advantageously used to give applicants using on-line work applications rapid, or even instantaneous, assessment regarding how they stand in view of the screening service's applicant screening criteria, while maintaining a thorough and rigorous applicant evaluation process.

A first level of screening allows the job screening service to better allocate resources among potential candidates. In this way, costly and time-consuming resources, such as background checks and personal interviews, can be allocated to better candidates, or not wasted on poor candidates. In one advantageous embodiment, applicants receiving an intermediate rating after the initial screening are given the option to pay the costs of background checks performed in the secondary screening. Thus, the costs of the screening process are allocated more efficiently among the parties.

This first level screening has the further advantage that high-ranking candidates can be given rapid feedback or fast-tracked. This encourages good candidates to stay with the process and increases the likelihood they will be retained. Thus, good candidates are promptly booked for secondary screening and placement. By getting the process to work faster it is less likely good candidates will find or even seek other employment before the screening service has processed them.

This provides an advantageous solution to a difficult problem that faces employment services. On the one hand, it is advisable to be thorough when performing background checks and candidates detailed evaluations to make sure candidates are credibly qualified. But this takes time, on the other hand, the best candidates tend to find employment quickly and are likely to find jobs before a thorough check is completed through traditional processes. Thus, there is a natural tension between thoroughly and credibly vetting candidates and moving quickly to hire the best possible candidates.

The disclosed rapid screening procedure provides for a process that is both thorough and rapid. Properly performed, the first level of screening allows a relatively high confidence determination of a candidate's future fit or value after a full screening. Accordingly, candidates passing the first screening can be scheduled for personal interviews at this stage, while the further screening, such as reference checking, is completed. This shortens the amount of time required to process an applicant because the interview can be scheduled and conducted, while other checks are performed. Furthermore, by ordering more expensive background checks only after passing the first round of screening, resources are not expended on applicants with a low likelihood of successfully completing the screening process.

There are generally six types of relevant information about applicants for service jobs: background, skills, experience, current situation, future desires/expectations and personality. Since service job workers often do not have college degrees or certifications, education is not typically a corner stone of the analysis. Education can be included in the future as more candidates have some sort of formal training, certification or education. If none of these six types of information are checked prior to an in person/video interview, significant amounts of time and other resources will be wasted on many applicants that do not have the qualifications required to be a good fit for a job. This is particularly true if one is applying high standards and only seeking the best candidates. However, if all six of these categories are thoroughly checked, it may take too much time to decide whether to ask a candidate for an in-person interview. This delay can cause good candidates to move on to other jobs. Accordingly, it is advantageous to quickly collect available and key information to evaluate first.

The disclosed approach enables the selection of candidates for in-person/video interviews based on rapidly available, accurate, granular information so that fewer of selected candidates are likely to be unsuitable upon final review.

FIG. 1 depicts an employment or job service system 100 in accordance with one embodiment of the present system. The employment or job service system 100 is a processor based computerized environment for practicing the presently disclosed methods. Advantageously, the employment or job service system is embodied on one or more server computers in a networked environment. As one skilled in the art would recognize, the various processes performed by the employment service system 100 could be distributed over a number of different connected processors or computers without departing from the teachings of the disclosed system. In particular, the arrows connecting various elements of the employment service system 100 disclose general information flow rather than specific hardware or network architectures.

Communications interface 101 receives information from applicant 500. This information can preferably include, a request from the applicant to be considered for work or employment, and the information required to perform the candidate suitability analysis (discussed more fully below). Preferably, this aspect of the communications interface 101 is embodied by a web server that displays a web interface for accepting and receiving information from the applicant. Alternately, this aspect of the communications interface could be performed by a network connected application or App (such as, mobile application for iOS, Android, or Windows Phone). As a further alternative, the communications interface could be embodied by a user interface on a computer at an employment service. In this embodiment, the applicant physically travels to the computer to input the requested information or an employee of the employment service inputs the information directly into the system. Persons of skill in the art will readily recognize other possible input interfaces and apparatuses can be employed as necessary.

The communications interface 101 optionally performs an additional function of transferring information between the candidate acquisition system 120 and placement or Job system 700. Placement system 700 represents the portion of the employment service that lists service employees or contractors for employment 720 and books 710 them once they are accepted by the candidate acquisition system. The placement system may perform other functions 750. The detailed operation of placement system 700 is not relevant here and will not be described; advantageous embodiments of possible placement systems are disclosed in U.S. Pat. No. 8,301,478, U.S. patent applications 20070220123 and 20110202551 by the present inventor, which are hereby incorporated by reference. The communication interface 101 can pass relevant information from the placement system 700 to the candidate acquisition system 120, such as number of open jobs and current skill levels of similar service professionals. Feedback from the placement system can also result in an increase of the ranking multipliers for certain skill bases that are in need in the placement system, thereby would improving the candidate acquisition system. For example, the placement system may indicate that waiters skilled in wine knowledge are in short supply. In response, the acquisition system could increase the weight in the primary screening criteria for wine knowledge and, thereby, allowing more of wine skilled waiter to be passed to secondary screening.

The candidate acquisition system 120 performs the functions of candidate evaluation in accordance with the present disclosure. Candidate evaluation is split into at least two screening processes primary screening 200 and secondary screening 300. If a candidate passes primary screening 200, secondary screening 300 is conducted. The secondary screening may include initiating more costly and time-consuming background checks, such as driving records searches and personal reference checking. The secondary screening may also include an interview of the applicant, which could take place in person, over the phone. These other potential lines of communication used during the secondary screening are reflected by the dotted line.

In one advantageous embodiment, the applicant is directly connected, via a video chat interface, such as Skype, with a representative of the employment service system for a secondary screening interview if the primary screening is passed. For example, an applicant conducting the application process via a web browser could be immediately informed that they have passed primary screening and then be connected to a video chat within their web browser for a personal interview. Alternately, a video interview could be scheduled for a time at the candidate's convenience. In a further embodiment of this invention, the on-line or in person interview such conducted is available for review by those seeking candidates in the future in the form of video files.

Figure 2:
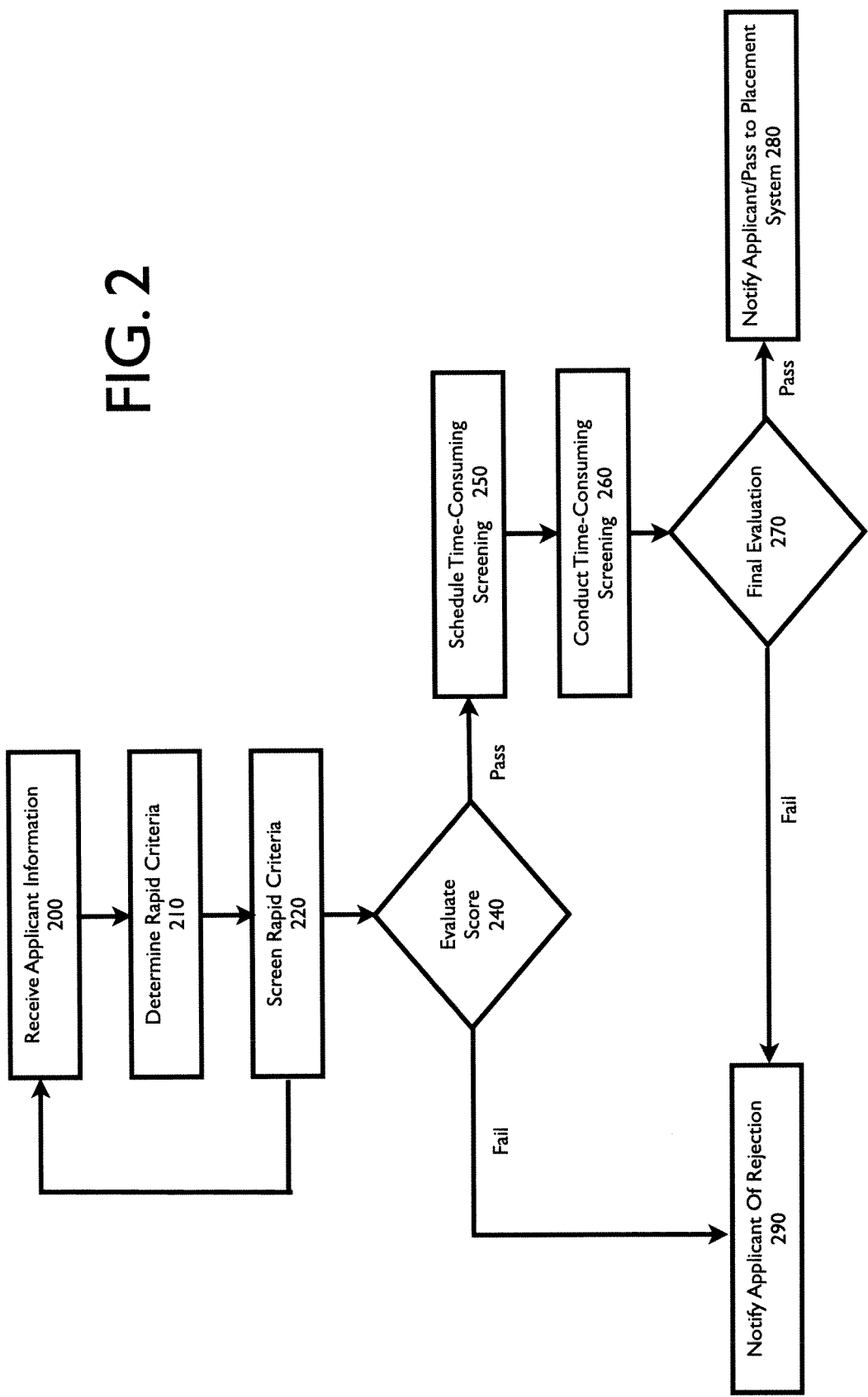
FIG. 2 shows an exemplary overview process for applicant screening.

FIG. 2 shows an exemplary flow diagram for a method of performing the disclosed screening system. The process begins with the receipt of information from the applicant at step 200. As discussed above, this information is preferably acquired via a web interface. This will allow the applicant to provide the information used by the system to evaluate the applicant, for example, name, social security number, work history, proof that the applicant is legal to work, skills, experience, future goals, current work situation, references (personal and employment), and personality profile. The required information can of course be tailored to the specific needs of the job in question or selected by applicant or the characteristics important to the screening service operator.

Figure 4B:
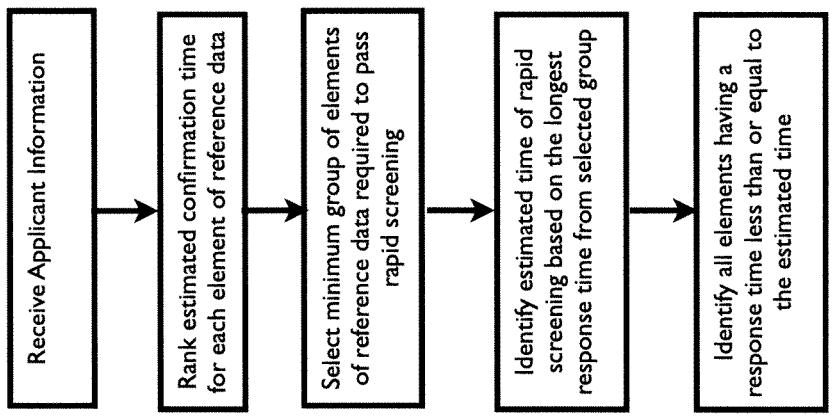
FIG. 4b shows an alternative exemplary process for making a rapid applicant evaluation.
Figure 4A:
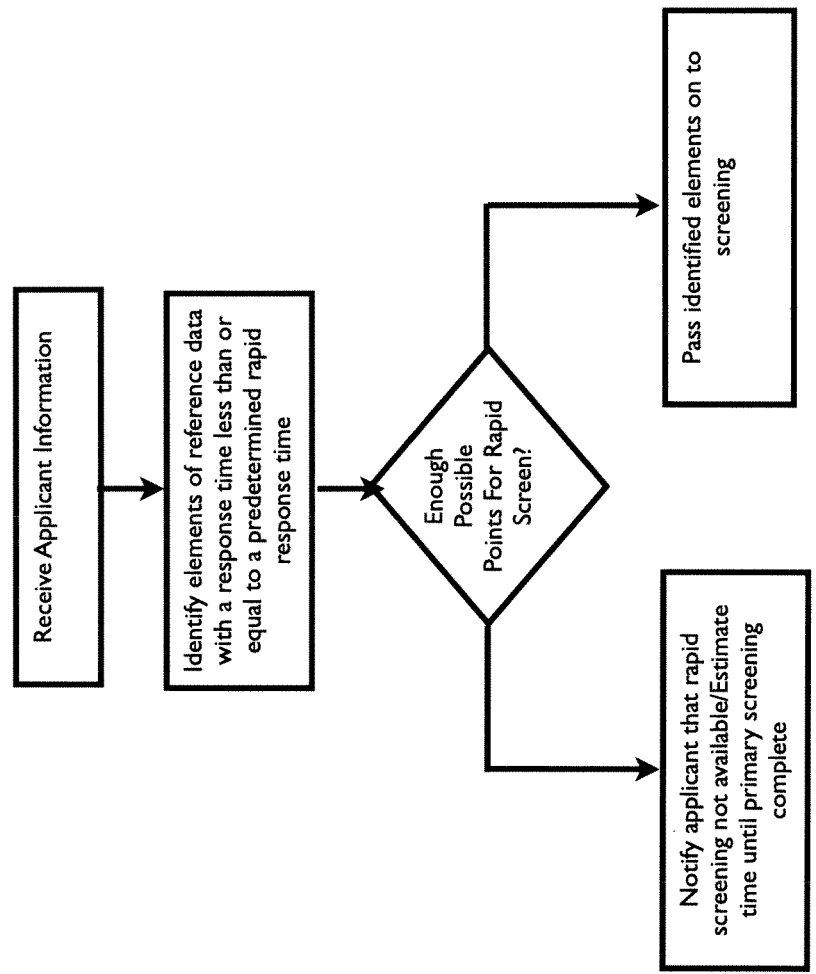
FIG. 4a shows an exemplary process for making a rapid applicant evaluation.

The next step in the process is to determine rapid criteria 210. In one embodiment, the information provided by the applicant in step 200 is evaluated to determine what information provided by the applicant can be rapidly checked. A further determination is made whether there is sufficient information to make a rapid evaluation of the applicant. This occurs because different applicants might have different information available and strictly requiring certain information might not always be suitable. Accordingly, a test is conducted to determine whether the applicant has provided enough information to make a rapid evaluation. If enough information is not available, a notice is provided. An exemplary method for performing this test is shown in FIG. 4a. Applicant information is received; applicant information that can be checked in less than a predetermined rapid response time is identified; and a determination is made whether there is enough information to perform rapid screening. If there is enough information to perform a rapid screening it is performed, otherwise the applicant is notified that rapid screening is not available and, optionally, given an estimate of when primary screening will be complete.

Alternately, the information from the applicant can be evaluated to determine when a first check will be completed. This is done, as shown in FIG. 4b, by looking at all the information that can be checked immediately. If there is sufficient information to make a determination of suitability then the process proceeds to the screening of rapid criteria. If the there is not sufficient information to make an immediate decision, the other information provided by the applicant is considered based on the length of time required to evaluate each item. To do so, the remaining non-immediately verifiable information is ordered from the quickest to check to longest to check. A determination is then made as to how much additional information is required to perform the rapid screening by going down the list starting at the quickest information to check. Once the information required to perform a primary screening has been determined, the time required to check the applicant can be determined.

While the determination of rapid criteria 210 allows some flexibility to the process, this step is optional. In a preferred embodiment this step can be skipped and the rapid criteria screening 220 can be directly preformed with the information provided by the applicant in step 200.

The screen rapid criteria step 220 takes the information provided by the applicant that can be rapidly evaluated and creates an applicant score based on that information. For example, in one embodiment, the applicant is asked through a web interface for information pertaining to the position they are seeking. This information includes particular job tasks and skills. Points are awarded to the applicant based on the tasks they perform and skills they posses. Points may further be awarded based on the applicant's proficiency in each skill and sub-skill. Points may also be awarded from background information, such as the applicant's location, willingness to travel, or pay rate.

It has been recognized that an applicant's driving record, criminal record and credit history are good predictors for overall job responsibility and performance, i.e., better credit evidences general responsibility and attention to detail in a work environment. Accordingly, applicant points can be awarded based on an applicant's credit report, when permitted under local law. It has further been recognized that information about the quality of an applicant can be gleaned from the way that they fill out the application forms (meta analysis). For example, applicants that fill out the required forms quickly and accurately are more likely to be good job candidate than those that are slow to fill out the forms and that make mistakes. Points can be awarded or subtracted accordingly.

The points calculated for candidates can be totaled into one omnibus score for evaluation. Using one omnibus score allows a broad diversity of information to accumulate to the applicants benefit. For example, a very capable and responsible candidate can still be identified as valuable in an omnibus scoring system even if they are not highly proficient in a large number of job skills. This, for example, might be the case with a smart inexperienced applicant just starting out who scores very well on many areas but has not yet developed an extensive skill set.

Alternatively, the points can be segregated by category, e.g., skills, background and/or meta analysis. Splitting the points categorically has the advantage of being able to maintain a minimum proficiency for certain categories. In this way, an applicant can fail the rapid criteria screening if the applicant does not pass each or any one of the categories. This can be used to ensure that minimum standards are met for one or more categories, such as driving skills for Nannies, if they were to drive children In either of these regimes, or a combination of the two, certain applicant information can be absolutely required (e.g., being legal to work in the U.S. and/or living in the local area) or automatically result in a denial (e.g., sex offender in a childcare job).

As shown in FIG. 2, the screening of rapid criteria can proceed in a loop with the receipt of the applicant's information. This demonstrates that the processes of receiving applicant information and screening rapid criteria need not occur serially such that all the information is received before the screening occurs. The calculation of the applicant's rapid screening score can occur simultaneously with the receipt of information.

After the information from the applicant that was suitable for rapid screening has been tallied, the score achieved by the applicant is evaluated 240. As shown, the evaluate score 240 step can be implemented as a pass-fail test. In this embodiment, if the applicant's rapid screening score does not meet the employment service's standards then the applicant is notified that he or she has been rejected 290, and may apply if the situation changes. If the applicant's rapid screening score meets the standards the process proceeds to scheduling time-consuming screening 250. In one embodiment, the rapid screening and scheduling of an interview is done in less than 24 hours. The particular scores that define pass or fail can be varied and set according to the standards and needs of the employment screening service. For example, depending on their target clientele some employment services might accept less experienced applicants than others. Or, even if two employment services had similar ultimate employment criteria, a particular employment service might be more or less willing to invest secondary, screenings and could adjust it score evaluations accordingly. Moreover, the evaluation could be automatically adjusted based on feedback from the placement system 700. For example, if the placement system has too many or two few service providers with particular skill sets, that information can be reported to the candidate acquisition system and the score evaluation could be moved up or down, accordingly.

In a preferred embodiment, the evaluate score step can have additional options beyond pass-fail. A middle level evaluation between pass and fail could be advantageously established to accommodate candidates who do not meet sufficient criteria to be a pure pass, but are not clear fail.

The middle level can be used advantageously in a number of ways. For example, applicants falling in the middle category could be asked to pay some or all of the expense of the secondary screening. Avoiding the cost of background checks (e.g., credit, driving, criminal) for too many applicants is a significant advantage of the rapid screening process for the employment service. However, otherwise suitable candidates might be cut out of the secondary screening based on cost considerations. These candidates could be given the opportunity to pay for these secondary screenings to have their full application considered. The middle level of evaluation could also be used to hold candidates for later evaluation. For example, if the pressure is to evaluate the best candidates as rapidly as possible, middle scoring applicants can be put into a queue to await evaluation on a somewhat longer schedule. The method could advantageously be used to ensure a steady supply of applicants, while moving the best candidates to the front of the evaluation. The middle level could, optionally, be reviewed by a person to make an evaluation whether to pass the applicant to the next level.

For applicants that make it though the evaluation of the rapid screening the more time consuming and expensive applicant screening procedures are conducted. This includes ordering expensive or time-consuming background checks, interviewing the applicant's references, and scheduling an in-person interview 250. If the in person interview is going to be conducted in the future, the applicant can preferably be provided with a calendar interface showing available interview slots. Alternately, a video chat interview can be immediately conducted.

Once the time-consuming screening 260 is completed, a final evaluation 270 can occur. The calculation of the final criteria can include all of the information from the prior rapid screening and the secondary screening. Or, the final evaluation can be just based on the second round of information. Or, the final evaluation can consist of a combination of some but not all of the two data sets. After the final evaluation the applicant is either notified of a rejection 290 or, if accepted, the applicant's information is passed to the placement system 280.

Figure 3:
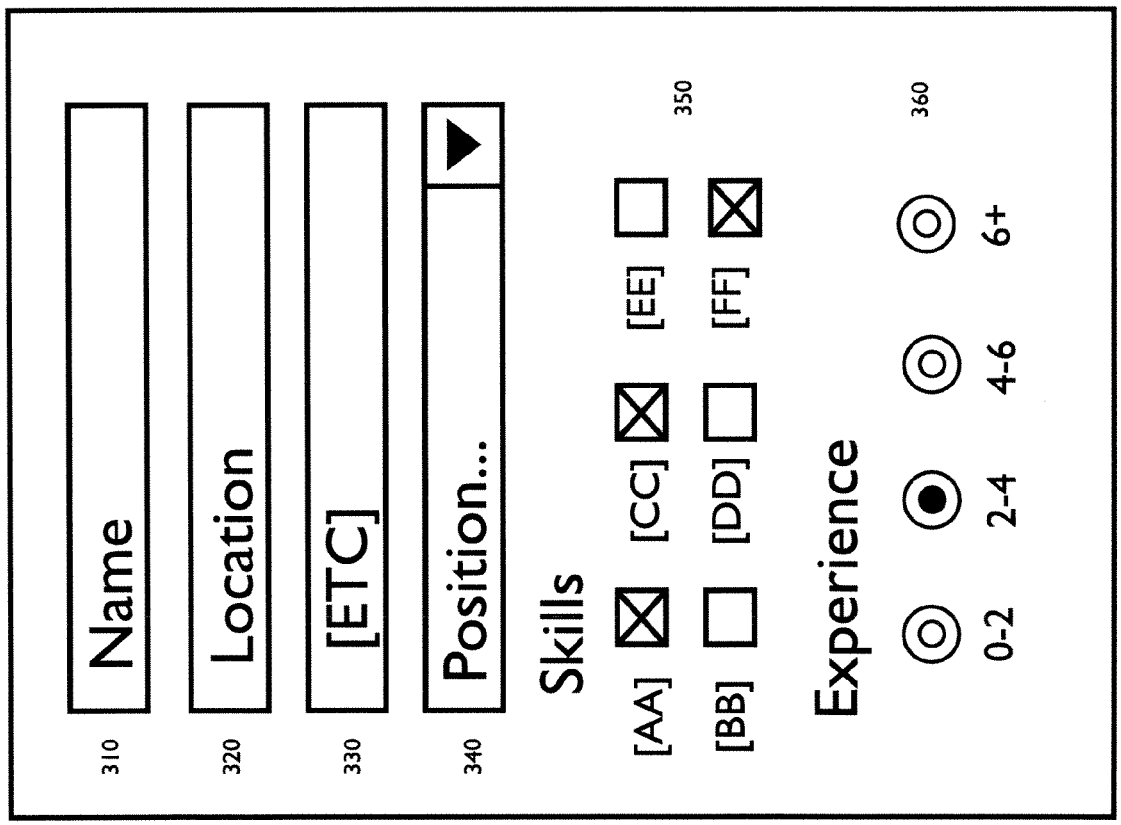
FIG. 3 shows an exemplary interface for gathering applicant information.

FIG. 3 shows an exemplary interface embodiment for collecting information about an applicant through a web interface. In accordance with the practice of persons of skill in the art, a user interface can be developed and tailored to the particular types of information to be collected. As shown in FIG. 3, text blocks are provided to collect information such as name 310, locations 320, or other information 330 or other information that is not suitable for use with pre-defined choices. Pull-downs can be used for items that are suitable to description using pre-defined choices, such as the job positions 340 that can be applied for by the applicant. Check boxes 350 can be employed for information, like skills, where there are a limited number of choices and an applicant may select multiple choices. Radio buttons 360 can similarly be used to where there are multiple limited choices and only one can be selected at a time, such as with years of experience.

In another embodiment of the interface, an applicant is allowed to apply for multiple positions or job types, for example a waiter and server, or nanny and housekeeper. Based on the multiple positions selected, appropriate skills (or sub-skills) choices are dynamically presented by the applicant interface for completion. These can be individually evaluated and/or in combination such that extra credit is provided to applicants skilled for multiple positions.

In a presently preferred embodiment, an applicant score is developed (Score A) based on (i) the hours they work (number of hours and/or whether they are available in high demand times), (ii) their flexibility to work outside their preferred hours, (iii) their location, (iv) their experience, and (v) their expected compensation.

A second score (Score B) is developed based on their work skills. For example, applicants applying for a housekeeper job would be asked to state their proficiency with respect to a number of relevant tasks such as ironing, cooking, childcare, driving, cleaning, organization, and maintaining silverware. It is recognized that it is advantageous to identify and inquire about many job tasks to get a substantial idea of the applicant's background. The particular areas of inquiry would be tailored to the job at issue, such that a personal assistant, nanny, chef, organizer and elder care applicant would get questions about tasks tailored to their job responsibilities.

Splitting the information considered in Score A and Score B as disclosed above has at least two notable advantages. One, it allows the determination of whether the candidate meets minimum requirements in two areas (i) general background and availability and (ii) job level skills. This allows the system to weed out applicants that have a low level of job skills (i.e., fail Score B) and/or applicants that have good skills but that are not flexible in their hours or that live too far away.

The particular weight of points for each item of information requested to develop Score A and Score B can be set and normalized by users of the employment system to suit their own expectations about applicants and the market they serve. In a preferred embodiment if the applicant meets minimum scores for both Score A and Score B, the applicant is passed on to the next stage of consideration. Notably, the information evaluated to develop Score A and Score B does not require the expenditure of any significant resources by the employment system. Thus, the Score A and Score B evaluation for the basis of a reasonable determination of whether to expend further resources evaluating the applicant.

If an applicant has passing scores for Score A and Score B, another score (Score C) is developed based upon information that requires confirmation from outside sources and/or has an associated cost. For example, Score C is preferably developed based on the applicant's credit check, criminal background, social security check, reference check, and driving record check. These background checks are automatically requested electronically and received by the candidate acquisition system via the communications interface. Any of the Score C check results that can be delivered instantaneously, or prior to a predetermined deadline, can be used—along with Score A and Score B—to decide whether to offer the applicant an interview. If the applicant passes the evaluation of Score A, Score B and available Score C data, he or she is offered an interview in-person or via a video chat such as Skype. In a preferred method, the interview schedule is offered while the rapidly qualified applicant is still connected with the communication interface a one-step end-to-end experience.

In another embodiment, the system further performs initiates an aptitude and/or psychological test of the applicant, as is known in the art. The test is conducted via the user interface on written questions. The test could be performed either as part of the initial screening or, advantageously, after the applicant has passed initial screening, but before a decision is made to pay for external background checks. If the applicant passes the aptitude and/or psychological test, the process will continue on to further screening. Otherwise, the applicant may be notified of a rejection.

The system can also automatically initiate the process of checking the applicant's references. During the information gathering process the applicant will be asked to provide personal and employment references. That information will be used by the system to send a text and/or email requesting the reference to select a suitable time to discuss the applicant, which could be supplied by return text or email. The text or email could also provide a link to website where the reference could see a calendar to schedule the discussion. The reference check is conducted at the appointed time by phone, video chat, or other communication channels known in the art.

In a preferred embodiment, the timing of at least one of the reference checks occurs prior to the applicant interview. This can be accomplished in one of two ways. First, the reference check scheduling process can occur before the applicant is given an opportunity to select a time after reference check meeting. Preferably, the applicant is offered times after a suitable time has elapsed after the scheduled reference check meeting, such as if the reference check is scheduled for next Tuesday at 9 AM, the candidate is offered times starting with next Tuesday at 11 AM (two hours). Alternately, the applicant can be permitted to select a preferred interview schedule time prior to confirming the reference check meeting. But then the applicant can be asked to choose another interview time if the reference check meeting is later scheduled after the applicant's selected time.

In another embodiment, there could be primary, secondary and tertiary screening. For example, the application questions and information, as filled in by the applicant in the communication interface is scored to decide to a) offer free background check b) offer background check paid by the applicant or c) not to offer the background check and reject the application. This primary screening is followed by instantaneously sending the background check request for key elements of the background check and evaluating those that are immediately available. Based on the combination of the application and rapidly available background check information, one could offer the time consuming in-person or video interview and schedule this ahead of time, prior to other details of the applicant are fully available.

In this process the screening is broken down into three stages. The first stage is based on the application alone, e.g., the skills, job, location and availability identified and meta-analysis. If the first stage is passed the background check of quickly available information is performed, e.g., credit report, social security, etc. If this second stage is passed. The applicant is offered an opportunity to schedule an interview. Prior to time of the scheduled interview a third stage screening is performed and the applicant's references are checked. If the reference check is satisfactory the applicant's interview is confirmed, otherwise the interview is canceled.

Figure 5:
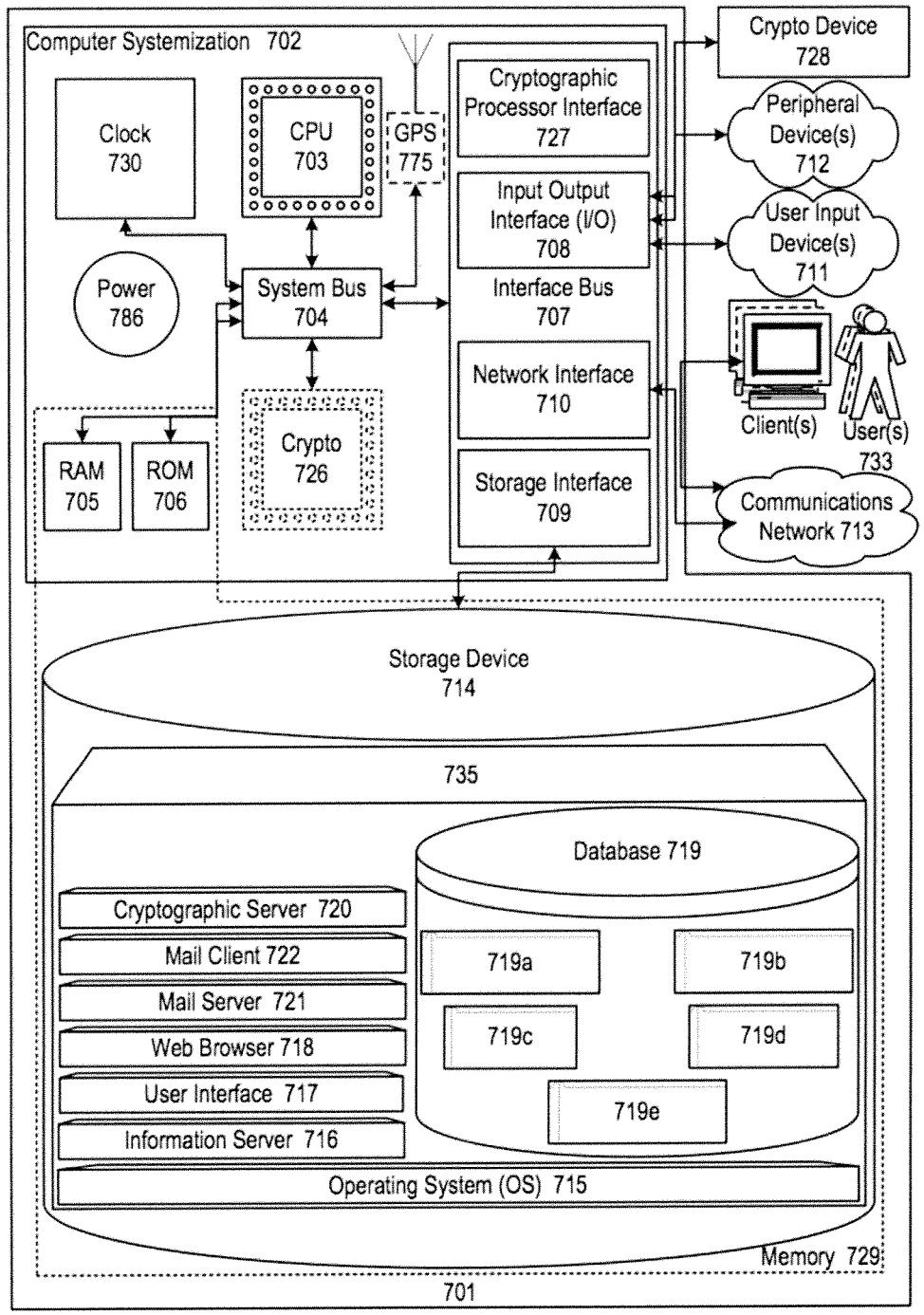
FIG. 5 shows a computer systemization in accordance with one embodiment of the present invention.

A particularly advantageous embodiment of the present invention is obtained by using an employment service controller to embody the various features described above. FIG. 5 illustrates inventive aspects of an employment service controller 701 in a block diagram. In this embodiment, the employment service controller 701 may serve to accept, retrieve, store, search, serve, submit, identify, transmit, instruct, generate, match, and/or update databases containing relevant information and/or service provider information and/or related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the employment service controller 701 may be connected to and/or communicate with entities such as, but not limited to: one or more users from user input devices 711; peripheral devices 712; and/or a communications network 713.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The employment service controller 701 may be based on common computer systems that may comprise, but are not limited to, components such as: a computer systemization 702 connected to memory 729.

Computer Systemization

A computer systemization 702 may comprise a clock 730, central processing unit (CPU) 703, a read only memory (ROM) 706, a random access memory (RAM) 705, and/or an interface bus 707, and most frequently, although not necessarily, are all interconnected and/or communicating through a system bus 704. Optionally, the computer systemization may be connected to an internal power source 786. Optionally, a cryptographic processor 726 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron, Phenom, Sempron, FX and/or Opteron; ARM based processor; IBM and/or Motorola's PowerPC; Intel's Celeron, Itanium, Pentium, Xeon, Core, Atom and/or XScale; and/or the like processor(s). The CPU interacts with memory through signal passing through conductive conduits to execute stored program code according to conventional data processing techniques. Such signal passing facilitates communication within the employment service controller and beyond through various interfaces. Should processing requirements dictate a greater amount speed, parallel, mainframe and/or super-computer architectures may similarly be employed. Alternatively, should deployment requirements dictate greater portability, tablets, smart phones or Personal Digital Assistants (PDAs) may be employed.

Power Source

The power source 786 may be of any standard form for powering small electronic circuit board devices such as the following power cells: alkaline, lithium hydride, lithium ion, nickel cadmium, solar cells, and/or the like. Other types of AC or DC power sources may be used as well. The power cell 786 is connected to at least one of the interconnected subsequent components of the employment service controller thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, conventionally although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the employment service controller is accessible through remote clients 733*b* (e.g., computers with web browsers) by users 733*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: light peak, thunderbolt, lightning; audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), HDMI. RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 711 may be card readers, dongles, finger print readers, gloves, graphics tablets, joysticks, keyboards, mouse (mice), remote controls, retina readers, trackballs, touch screens, trackpads, and/or the like.

Peripheral devices 712 may be connected and/or communicate to I/O and/or other facilities of the like such as network interfaces, storage interfaces, and/or the like. Peripheral devices may be audio devices, cameras, dongles (e.g. for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the employment service controller may be embodied as an embedded, dedicated, and/or monitor-less (i.e., headless) device, wherein access would be provided over a network interface connection.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the employment service controller and/or a computer systemization may employ various forms of memory 729. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; SSD; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 729 may contain a collection of program and/or database modules and/or data such as, but not limited to: operating system module(s) 715 (operating system); information server module(s) 716 (information server); user interface module(s) 717 (user interface); Web browser module(s) 718 (Web browser); database(s) 719; cryptographic server module(s) 720 (cryptographic server); the employment service module(s) 735; and/or the like (i.e., collectively a module collection). These modules may be stored and accessed from the storage devices and/or from storage devices accessible through an interface bus. Although non-conventional software modules such as those in the module collection, typically, are stored in a local storage device 714, they may also be loaded and/or stored in memory such as: peripheral devices, RAM, remote storage facilities through a communications network, ROM, various forms of memory, and/or the like.

Operating System

The operating system module 715 is executable program code facilitating the operation of the employment service controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, iOS, Android, Microsoft DOS, Palm OS, Windows 8, Windows 7, Windows RT, Windows 2000/2003/3.1/95/98/CE/Millenium/NT/XP/Vista (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the employment service controller to communicate with other entities through a communications network 713. Various communication protocols may be used by the employment service controller as a subcarrier transport mechanism for interaction, such as, but not limited to: multicast, TCP/IP, UDP, unicast, and/or the like.

Information Server

An information server module 716 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an LITTP request is resolved to a particular information server, the information server resolves requests for information at specified locations on the employment service controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the employment service controller, operating systems, other program modules, user interfaces, Web browsers, and/or the like.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, iOS, Microsoft's Windows 8, or Unix's X-Windows provide a baseline and means of accessing and displaying information graphically to users.

A user interface module 717 is stored program code that is executed by the CPU. The user interface may be a conventional graphic user interface as provided by, with, and/or atop operating systems and/or operating environments such as Apple Macintosh OS, e.g., Aqua, Microsoft Windows 8, Windows Vista, Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 718 is stored program code that is executed by the CPU. The Web browser may be a conventional hypertext viewing application such as Firefox, Chrome, Safari. Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into smart phones, tablets, PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the employment service enabled nodes. The combined application may be nugatory on systems employing standard Web browsers.

Employment Service Controller Module

The employment service controller module 735 is stored program code that is executed by the CPU. The employment service controller module affects accessing, obtaining and the provision of employment service, and/or the like across various communications networks.

The employment service controller module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. The employment service controller module may communicate to and/or with other modules in a module collection, including itself, and/or facilities of the like. Most frequently, the employment service controller module communicates with an employment service database containing the data required to be stored by the system, operating systems, other program modules, and/or the like. The employment service controller module may contain, communicate, generate, obtain, and/or provide program module, system, user, and/or data communications, requests, and/or responses.

Distributed Employment Service Controller Module

The structure and/or operation of any of the employment service controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the employment service controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A computer implemented method for employment suitability analysis comprising:
   presenting a user interface for collecting applicant background information from an applicant;
   receiving via the user interface applicant background information at a processing system comprising: skills, identification information, and experience;
   analyzing via the processing system the received skills and experience information to perform a first test of suitability for the applicant;
   the processing system transmitting background check requests, via a network interface, based on the identification information if the applicant receives a passing score on the first test of suitability;
   receiving at the processing system background check results for the applicant and analyzing the background check results to perform a second test of suitability for the applicant;
   presenting to the applicant via the user interface an interview scheduling screen if the applicant receives a passing score on the second test suitability.

2. The method of claim 1 further comprising analyzing the speed and accuracy with which the user interface receives applicant information wherein the speed and accuracy analysis is considered as part of the first test of suitability for the applicant.

3. The method of claim 1 wherein the background check requests comprise one or more of the following: Social Security validity check; credit report; drivers license check; driving record check; or criminal background check.

4. The method of claim 1 further comprising receiving via the user interface an interview schedule time and presenting via the user interface a scheduling confirmation.

5. The method of claim 1, wherein the received background information includes reference details; and further comprising transmitting reference interview scheduling requests to the references identified by the reference details.

6. The method of claim 5 wherein the reference interview scheduling requests are transmitted via email and the transmitted email includes a link to a reference scheduling user interface.

7. The method of claim 5 wherein the reference interview scheduling requests are transmitted as a text message including a link to a reference scheduling user interface.

8. The method of claim 5 further comprising offering interview schedules to references at a time prior to an interview time scheduled by the applicant.

9. The method of claim 1 wherein the user interface is provided via a Web server.

10. The method of claim 1 wherein the user interface is provided via a mobile device app.

11. The method of claim 1 further comprising presenting via the user interface a request for payment a background check costs when the applicant receives an intermediate score on the first test of suitability; and, processing payment of the background check costs prior to transmitting background check requests.

12. The method of claim 1 further comprising initiating a videoconference involving the applicant.

13. The method of claim 1, wherein the received background information includes reference details; and further comprising initiating a videoconference involving the reference.

14. The method of claim 1 wherein the user interface presented is dynamically adjusted to display different skills depending upon a job selected by the applicant.

15. The method of claim 1 further comprising providing feedback to the applicant via the user interface informing the applicant that the first test of suitability was passed.

16. The method of claim 1 wherein the receipt of applicant background information comprises a series of subtasks relevant to a job requested by the applicant.

17. The method of claim 16 wherein the user interface presents subtasks relevant to the job requested by the applicant for selection by the applicant via the user interface.

18. The method of claim 1 further comprising querying a job placement system for information regarding needed skills; receiving needed skills information from the job placement system; and adjusting the analysis for the first test of suitability based on the received needed skills.

19. The method of claim 1 wherein the background information further includes applicant availability.

20. The method of claim 1, wherein the received background information includes reference details; and further comprising scheduling an applicant interview; transmitting a rescheduling request to the applicant if a reference interview is not conduct prior to the scheduled time of the applicant interview.

21. A computer system for employment suitability analysis comprising:
- a processor;
- a memory connected to the and in communication with the processor and containing processor-executable instructions;
- a network interface connected to the processor to provide network access to the processor;
- wherein the processor executes instructions contained in the memory and the instructions instruct the apparatus to:
  - receive via the network interface applicant background information at the processor comprising: skills, identification information, and experience;
  - analyze via the processor the received skills and experience information to perform a first test of suitability for the applicant;
  - transmit via the network interface background check requests based on the identification information if the applicant receives a passing score on the first test of suitability;
  - receive via the network interface background check results for the applicant;
  - analyze via the processor the background check results to perform a second test of suitability for the applicant;
  - present to the applicant via network interface an interview scheduling screen if the applicant receives a passing score on the second test suitability.

22. A non-transitory computer readable medium for storing processor executable comprising instructions for employment suitability analysis that when executed by a processor instruct a computer to:
- receive via a network interface applicant background information at the processor comprising: skills, identification information, and experience;
- analyze via the processor the received skills and experience information to perform a first test of suitability for the applicant;
- transmit via the network interface background check requests based on the identification information if the applicant receives a passing score on the first test of suitability;
- receive via the network interface background check results for the applicant;
- analyze via the processor the background check results to perform a second test of suitability for the applicant;
- present to the applicant via network interface an interview scheduling screen if the applicant receives a passing score on the second test suitability.

* * * * *